Aug. 23, 1960 H. ANSON 2,949,657
APPARATUS FOR CASTING CONCRETE SECTIONS
Filed March 5, 1959 2 Sheets-Sheet 2

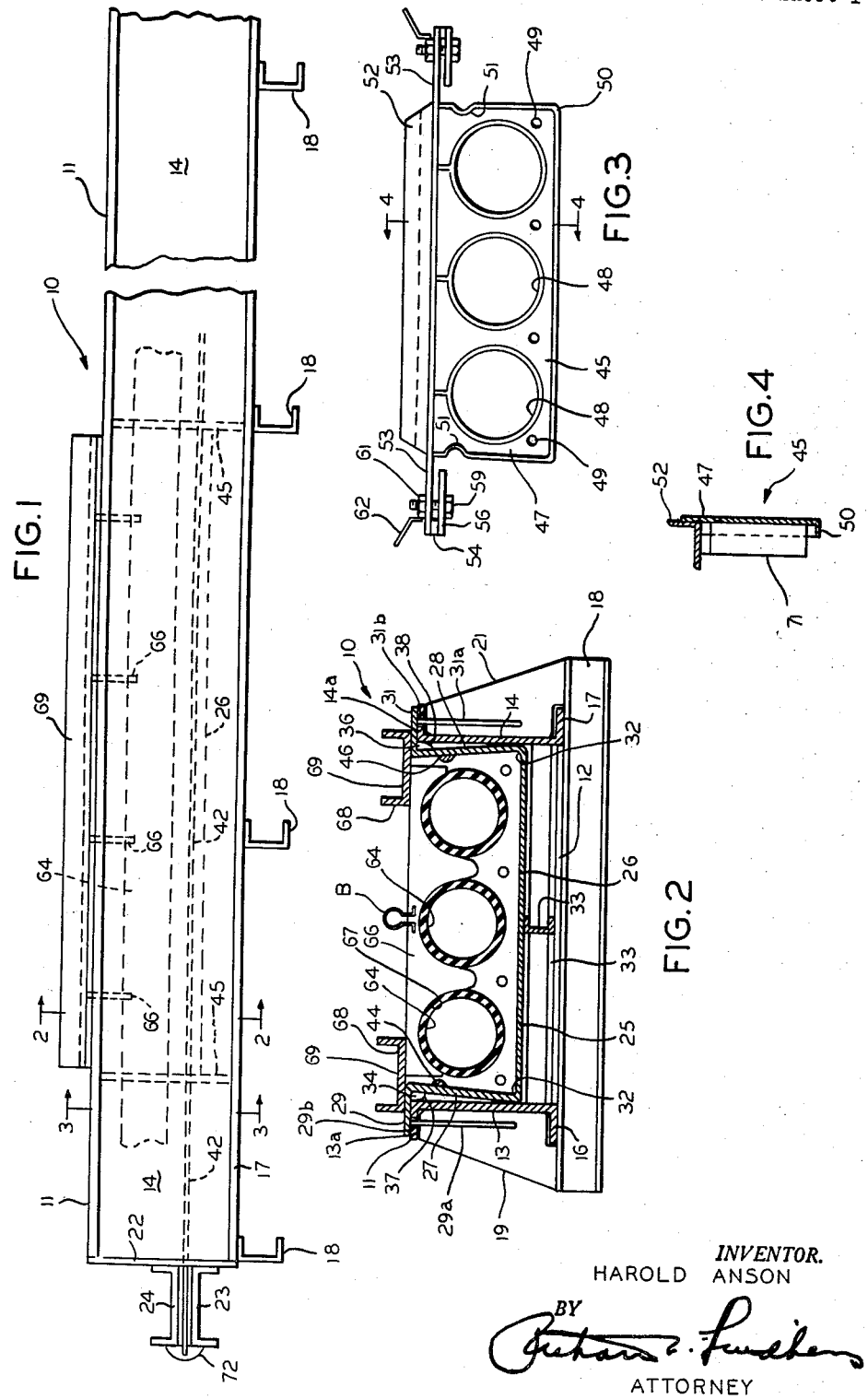

*INVENTOR.*
HAROLD ANSON
BY
ATTORNEY

# United States Patent Office 2,949,657
Patented Aug. 23, 1960

2,949,657
APPARATUS FOR CASTING CONCRETE SECTIONS
Harold Anson, 6431 N. Damen Ave., Chicago, Ill.
Filed Mar. 5, 1959, Ser. No. 797,356
5 Claims. (Cl. 25—122)

This invention relates generally to apparatus for casting concrete shapes, and has particular reference to apparatus for casting roof and floor slabs having a proper amount of batter and a shear key therein, with the sections having line contact with each other near the bottoms thereof, the shear across adjacent sections being provided with shear or grout keys connecting adjacent sections.

The apparatus according to the present invention is characterized by a cradle having a base with upstanding laterally spaced side walls, the cradle cooperating with a pan having a base portion with integral side walls extending upward therefrom, the width of the base portion corresponding to the distance between the spaced side walls of the cradle. The side walls of the pan are integral with the base portion, and the pan is preferably made of steel of a gauge so that when the walls of the pan are constrained inwardly for the casting operation, the resiliency of the pan will enable the walls thereof to separate readily from the shape cast within the pan. The exterior face of each of the walls of the pan is provided with structure which cooperates with the side walls of the cradle so as to constrain the side walls inwardly a desired amount. Preferably, the tops of the side walls of the pans are provided with flanges to aid in the support of the pan within the cradle, although the pan can be supported by either the base of the cradle or by other supports spaced at intervals throughout the length of the cradle. The depth of the section cast within the pan can accordingly be varied by such supports, the height of such supports being varied together with the pan.

In a preferred embodiment of the invention the interior faces of the side walls of the pan are provided with a member extending longitudinally of the pan so as to provide an indentation in the sides of the cast section. Each of the walls of the cast sections is provided with batter, and with a keyway, so that when grout is poured at the joint between adjacent sections the shear can be transferred between adjacent slabs by means of the shear key thus formed.

Preferably, the pan is formed from steel of a suitable gauge, the walls being bent upwardly from the base portion by a brake, so that at the intersection of the wall with the base portion there is provided a smooth contour which enables the cast sections to have line contact when placed next to each other. The line contact prevents the escape of the grout poured between the adjacent sections.

The pan is preferably formed with the angle between the base portion and each side wall being slightly greater than 90°, of the order of approximately 92° or 93°, the walls being constrained within the cradle so that such angles become less than 90°, of the order of approximately 88° or 89°. The resiliency of the so-constrained walls thus enable them to spring away from the cast section when the section and pan are lifted from the cradle.

The pan is provided with flanges having liner pins cooperating with holes in the side flanges of the cradle so that the pan and cast section are guided without tipping during removal from the cradle.

With the foregoing considerations in mind, it is a principal object of this invention to provide an improved apparatus for casting concrete sections having the proper amount of longitudinal batter therein, the sides of each section being provided with an indentation which can be grouted so as to provide a shear key transmitting shear between adjacent sections.

Another and important object is to provide apparatus for casting concrete sections, the concrete being molded in a pan having the sides thereof constrained to provide the proper batter of the cast section, the cast section and the pan in which it is cast being removed as a unit from a supporting cradle, and the resilience of the pan enabling it to strip readily from the cast section.

Yet another object comprehends the casting of sections having any desired depth, a cradle being provided which will accommodate pans of varying depths, the pan being supported within the cradle and having the side walls thereof constrained a proper amount to provide batter in the finished cast section irrespective of the depth of the section being cast.

Still another object is to provide apparatus for casting of a concrete section by means of a pan supported within a cradle, the pan having guide pins on the side flanges thereof which are guided within holes in the flanges of the cradle, such guide pins and guide holes enabling the casting and pan to be withdrawn from the cradle without canting or tipping of the cast piece and its pan.

Other objects and important features of the invention will be apparent from a study of the specification following taken with the drawings, which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope of the subjoined claims.

In the drawings:

Fig. 1 is a side view of apparatus according to the present invention for casting a concrete section;

Fig. 2 is a section taken along the line 2—2 of Fig. 1 looking in the direction of the arrows, and showing a pan in a position of cooperation with the cradle of Fig. 1, and showing the sides thereof constrained by the walls of the cradle so as to provide batter in a section cast within the pan;

Fig. 3 is a view taken along the line 3—3 of Fig. 1 looking in the direction of the arrows showing details of a bulkhead employed with the cradle of Fig. 1;

Fig. 4 is a detailed elevational view looking in the direction of the arrows 4—4 of Fig. 3;

Figure 6:
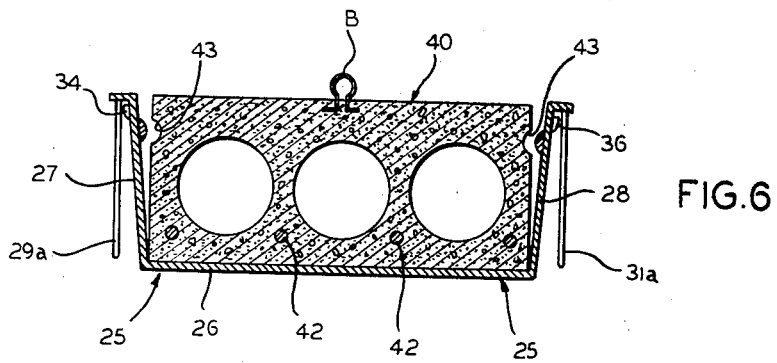
Figure 7:
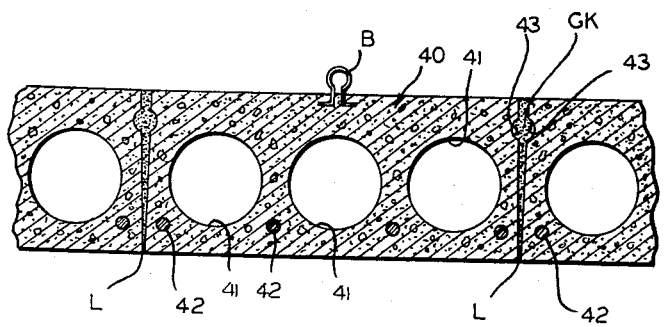

Fig. 6 is a transverse section taken through a finished casting formed within the cradle and pan of Figs. 1 and 2, showing how the resiliency of the side walls of the pan enables the pan to be stripped readily from the section; and Fig. 7 is a transverse sectional view showing a number of cast sections placed in side-by-side contiguous relationship, and showing a grout key poured between the adjacent sections, the grout key enabling the shear to be transmitted between the sections.

Referring now particularly to Figs. 1 and 2 of the drawings, the apparatus according to the present invention is referred to generally by the reference numeral 10 and includes a longitudinally extending cradle 11 consisting of a base 12 and laterally spaced channel members 13 and 14, the respective flanges 16 and 17 thereof resting upon transversely extending channel members 18 for support thereof. The base 12 is likewise supported upon the channels 18. Each of the channel members 13 and 14 is welded to the transverse channels 18, and gusset plates 19 and 21 are welded to the respective channels 13 and 14 and to the channels 18 to maintain the spaced channels 13 and 14 in properly spaced relationship.

The cradle 11 thus far described is also secured at its ends against distortion by means of an end plate 22 welded to the respective channels 13 and 14, the end plate 22 being additionally stiffened by channels 23 and 24 welded to the end plate 22 at their base flanges. The channels 23 and 24 also form an abutment for prestressed reinforcing steel as will be described.

A pan indicated generally by the reference numeral 25 rests within the cradle 11 for the casting therein of a concrete section, see also Fig. 6. The pan 25 has a base portion 26 and has laterally spaced side walls 27 and 28 extending upward therefrom, the side walls 27 and 28 having respective flanges 29 and 31 which rest upon the respective upper flanges 13a and 14a of the channels 13 and 14.

The side walls 27 and 28 of the pan 25 are preferably formed integrally with the base portion 26 and the pan may be made of No. 10 gauge mild steel or the like, the pan 25 being formed as seen in Fig. 2 upon a brake or the like. The base portion 26 of the pan 25 is of a width corresponding to the spacing between the channels 13 and 14, and the side walls 27 and 28 of the pan 25 are bent with respect to the base portion 26 in such a fashion as to provide a smooth curve 32 at the juncture of the side walls 27 and 28 with the base portion 26.

As seen in Fig. 2, the base portion 26 of the pan 25 may be supported upon channels 33 extending transversely of the cradle 11 and between the laterally spaced channels 13 and 14 thereof, the channels 33 resting upon the base 12 of the cradle 11. The height of the channel 33 varies in accordance with the depth of the pan 25, and in cases where a section is to be cast within the pan 25 of a depth corresponding to the depth of the cradle 11, the channels 33 will be first removed.

As seen in Fig. 2, the pan 25 is placed in position between the side walls 13 and 14 of the cradle 11, the side walls 27 and 28 of the pan 25 each being constrained inwardly by respective cams 34 and 36, cam 34 being preferably welded to the outer face of the wall 27 and underneath the flange 29, and cam 36 being welded to the outer face of the wall 28 and beneath the flange 31. The cams 34 and 36 have respective smooth heels 37 and 38 so that the pan 25 can freely move downward between the channels 13 and 14, the contour of the cams 34 and 36 being such as to constrain the walls 27 and 28 inwardly. The cams 34 and 36 may extend longitudinally of the pan 25, or may be spot welded at proper intervals therealong.

It should be noted that the angle between the base portion 26 and each of the side walls 27 and 28 of the pan 25 when in the unconstrained position seen in Fig. 6 is slightly greater than 90°, approximately of the order of 91° or 92°, and that such angle when the pan 25 is in the constrained position seen in Fig. 2 is less than 90°, of the order of 88° to 89°, so as to provide from 1° to 2° of batter in the sides of the section cast within the pan 25.

The pan 25 is guided in its movement into the cradle 11 by means of a number of liner pins 29a and 31a extending downward from the respective flanges 29 and 31 and spaced therealong. The pins 29a and 31a pass through holes 29b and 31b in the respective flanges 13a and 13b of the channel members 13 and 14. The dimension of the holes 29b and 31b is such as to permit the lateral shifting of the pins 29a and 31a when the side walls 27 and 28 are constrained inward by the cam members 34 and 36.

The pins 29a and 31a also serve to guide the cast section and pan 25 when they are raised out of the mold in a fashion to prevent undue canting or tipping thereof and their length is substantially equal to the depth of the pan 25.

The apparatus thus far described is particularly useful in casting a hollow core concrete section as seen in Figs. 6 and 7 and referred generally by the reference numeral 40. Each of such sections may have one or more cores 41 therein to lighten the weight thereof and the sections are preferably formed with prestressed reinforcing 42 located near the bottom portions of the cast section.

Each of the sections 40 cast within the pan 25 is provided with a key 43 in the side walls thereof, such key being provided by longitudinally extending strips 44 and 46, each being preferably of a semi-circular cross-section and welded respectively to the inner faces of the walls 27 and 28 of the pan 25.

Structure is provided for casting a section of a specified length within the cradle 11 and pan 25, the pans 25 being in some cases of a length to cast one or more sections 40 at a time. To this end a bulkhead indicated generally by the reference numeral 45 is arranged to be supported by the cradle 11 and within the pan 25. The bulkhead 45 comprises a flanged wall 47 having openings 48 therein corresponding to the cores 41 formed within the cast section 40, see Fig. 6, and also having openings 49 for the extension therethrough of the reinforcing members 42 seen in Figs. 6 and 7. The bulkhead 45 is likewise notched as at 51 to accommodate the strips 44 and 46 extending longitudinally of the pan 25. The bulkhead 45 is arranged to extend into the pan 25 which may be of a longitudinal dimension corresponding substantially to the length of the cradle 11 seen in Fig. 1, and is provided with the batter therein corresponding to the batter of the finished cast section. The amount of the batter of the section is exaggerated as seen in Fig. 2 for purposes of clarity in describing the invention. The thickness of the section comprising the pan is likewise exaggerated as seen in Fig. 2.

Figure 5:
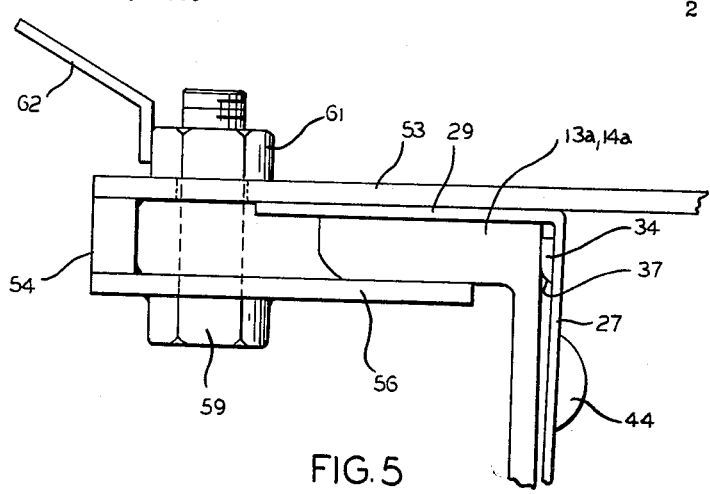
Fig. 5 is a detailed elevational view of structure for maintaining the bulkhead of Fig. 3 and the pan shown in Fig. 2 in place within the cradle seen in Fig. 1.

The bulkhead 45 has a stretcher 52 in the form of an angle member welded at the top thereof, stretcher 52 extending across the cradle 11 and having a base leg 53, see also Fig. 5. The base leg 53 is provided at each end thereof with a U-shaped clamp comprising a spacer member 54 welded at the end thereof and depending therefrom, the lower side of the spacer member 54 having extending therefrom a limb 56 engaging the lower side of the upper flanges 13a or 14a of the respective channel members 13 and 14. A bolt 59 passes through the base leg 53 of stretcher 52 and through the limb 56, a nut 61 having an operating handle 62 being threaded to the bolt 59. It will be seen that the structure described with reference to Figs. 3 and 5 is arranged to hold both the pan 25 and the bulkhead 45 in position within the cradle 11.

As seen in the several figures, when it is desired to cast a section as seen in Figs. 6 and 7 with the cores 41 therein, there is provided a plurality of longitudinally extending inflatable tubes 64 which extend through the bulkhead 45 as seen in Fig. 1. The tubes 64 are inflated by any suitable means, and each is provided with fittings, not shown, for maintaining the pressure therein. During the casting operation and when the cradle 11 is being vibrated, the buoyancy of the tubes 64 causes them to rise up out of the concrete mix being cast within the pan 25. A hold down member 66 is accordingly provided at intervals along the tubes 64. The hold down member 66 is in the form of a flat plate having arcuate cut out sections 67 conforming to the external diameter of the tube 64, and is welded at each end thereof to a channel 68 having its web 69 resting upon the flanges 29 and 31 of the pan 25.

In order to guide the inflatable tube 64 past the bulkhead 45, each of the bulkhead plates 47 thereof is provided with a collar 71 welded to the exterior face thereof, see particularly Fig. 4. In casting a section 40 as seen in Figs. 6 and 7 within the pan 25, the reinforcing members 42 are first placed in position, one end of such reinforcing members being anchored at one end as at 72 to the channels 23 and 24 extending from the end plate 22 spacing the channels 13 and 14 of the cradle 11. The other end of the reinforcing steel 42 is anchored at the other end of the cradle 11, and suitable stress is placed thereon at such end of the cables 42.

During the casting operation, the hold down device consisting of the transverse extending plate 66 and its channels 69 is placed in position as seen in Fig. 2 to hold down the tube 64, to prevent the buoyancy thereof from lifting the tubes out of the concrete mix being poured. In the customary operation, the cradle 11 is vibrated to secure a dense concrete mix, and after the initial vibration the hold down member 66 together with their channels 69 can be lifted from the position seen in Fig. 2 to complete the vibrating operation. During the completion of the vibration the voids left by the hold down plate 66 will be filled in, thereby securing a dense concrete mix throughout the entire cast section 40. The cradle, together with its pan 25, is cured for a period while the reinforcing steel is under tension. When the curing period is completed to a point where the concrete contains a compressive strength of 4000 p.s.i., the stress can be removed from the reinforcing steel 42, the steel being then cut at the ends of the cast section.

When the concrete has taken a sufficient set, the tube 64 can be deflated and removed from the cast section by endwise movement thereof through the openings 48 in the bulkhead 49.

When the cast section has reached the desired compressive strength it can be lifted at each end by bails B disposed at each end of the cast section and placed therein while the concrete is still plastic, the cast section 40 being then lifted out of the cradle together with its pan 25. As the section 40 together with the pan 25 is lifted upward out of the cradle 11, the constraint against the side walls 27 and 28 of the pan is removed and the inherent resiliency thereof causes the side walls 27 and 28 to spring away from the cast section 40, as seen more clearly in Fig. 6. It will be remembered that the inside of the pan 25 is suitably oiled to prevent any bond between the pan 25 and the cast section 40.

As it is being lifted from the cradle 11 to a position where the base portion 26 is substantially even with the top of the cradle 11, the pan 25 will in most cases be freed from the cast section 40, and the weight of the pan will be sufficient to cause it to slide down to its proper position within the cradle 11, the side walls 27 and 28 of the pan 25 being constrained inwardly once more by the cams 34 and 36, the pan 25 being then once more within the cradle 11 for a repeated casting operation.

It will be remembered that the pan 25 is so constructed that the included angle between its base portion 26 and either of the side walls 27 or 28 will be of the order of an amount slightly in excess of 90°, and preferably of the order of 92 or 93°. When the pan is in position within the cradle 11, the included angle between the base portion 26 and the side walls 27 and 28 will be of an amount somewhat less than 90°, preferably of the order of 88 or 89°. This difference in the angle between the base portion and the walls 27 and 28 of the pan 25 enables the resiliency of the metal to cause the metal of the pan to spring away from the cast section as seen in Fig. 6.

The finished sections can be laid adjacent each other with substantially only line contact along a line L at the bottom of each such section, there being by the configuration of the pan 25 a certain amount of batter in each cast section. This batter of each of the sections enables grout to be freely poured between the adjacent sections, there being provided at the key way 43 in each of the sections a grout key GK as seen in Fig. 7.

It will be apparent from the description foregoing that there has been provided both simple and novel apparatus for casting a concrete section. The casting operation requires a cradle which need not be adjusted during the casting operation and a pan simply constructed and enabled to cooperate with the cradle so as to provide a cast section having the proper batter. It will be seen from the description foregoing that the pan cooperating with the cradle is readily detachable therefrom, all without the need of adjusting screws, levers, and the like.

While the inventor has been described in terms of an embodiment which it has assumed in practice, the scope of the invention is intended to be limited only by the claims here appended.

I claim as my invention:

1. Apparatus of the class described for casting a concrete beam or the like wherein all of the operations of casting and stripping the finished casting are characterized by the elimination of any operation requiring turning over of the apparatus and the finished casting, said apparatus comprising a longitudinally extending fixed cradle including a base and laterally spaced rigid side walls secured to said base, a pan movable with respect to said cradle and adapted to be inserted between the walls of said cradle for the casting therein of a concrete shape, said pan being formed from resilient material and comprising a base portion with laterally spaced walls extending upward therefrom, the width of said base portion corresponding substantially to the interior spacing of the walls of said cradle, each wall of said pan and said base portion defining in the unconstrained position of said pan outside of said cradle an included angle greater than 90°, a flange extending laterally of each of the side walls of said pan adapted to rest upon a wall of said cradle, shear key defining means secured along the inside faces of the walls of said pan and extending longitudinally thereof, and means secured to the outer walls of said pan and engaging the interior faces of the walls of said cradle for elastically constraining the walls of said pan inward and angularly from the base portion of said pan, each wall of said pan and said base portion defining in the constrained position of said pan in said cradle an included angle less than 90°, the section cast in said pan being subsequently removable with said pan from said cradle by upward movement of said pan and casting, the removal of the constraint upon the side walls of said pan causing said side walls elastically to move away from the finished cast section to a position affording clearance for said shear key defining means for the removal of the pan from the so cast section, said finished cast section being characterized by battered side walls with keyways therein.

2. Apparatus of the class described for casting a concrete beam or the like wherein all of the operations of casting and stripping the finished casting are characterized by the elimination of any operation requiring turning over of the apparatus and the finished casting, said apparatus comprising a longitudinally extending fixed cradle including a base and laterally spaced rigid side walls secured to said base, a pan movable with respect to said cradle and adapted to be inserted between the walls of said cradle for the casting therein of a concrete shape, said pan being formed from resilient material and comprising a base portion with laterally spaced walls extending upward therefrom, the width of said base portion corresponding substantially to the interior spacing of the walls of said cradle, each wall of said pan and said base portion defining in the unconstrained position of said pan outside of said cradle an included angle greater than 90°, shear key defining means secured along the inside faces of the walls of said pan and extending longitudinally thereof, and means secured on the exterior faces of each of the walls of said pan near the top portions thereof and contacting the interior faces of the walls of said cradle for elastically constraining the walls of said pan inward and angularly from the base portion of said pan, each wall of said pan and said base portion defining in the constrained position of said pan in said cradle an included angle less than 90°, the section cast in said pan being subsequently removable with said pan from said cradle by upward movement of said pan and casting, the removal of the constraint upon the side walls of said pan causing said side walls to move elastically away from the finished cast section for the removal of the pan from the so finished cast section to a position affording clearance for said shear key defining means, said cast section being characterized by battered side walls with keyways therein.

3. Apparatus of the class described for casting a concrete beam or the like wherein all of the operations of casting and stripping the finished casting are characterized by the elimination of any operation requiring turning over of the apparatus and the finished casting, said apparatus comprising a longitudinally extending fixed cradle including a base and laterally spaced rigid side walls secured to said base, a pan movable with respect to said cradle and adapted to be inserted between the walls of said cradle for the casting therein of a concrete shape, said pan being formed from resilient material and comprising a base portion with laterally spaced walls extending upward therefrom, the width of said base portion corresponding substantially to the interior spacing of the walls of said cradle, each wall of said pan and said base portion defining in the unconstrained position of said pan outside of said cradle an included angle greater than 90°, a flange extending laterally of each of the side walls of said pan adapted to rest upon a wall of said cradle, and means secured on the exterior faces of each of the walls of said pan near the top portions thereof and contacting the interior faces of the walls of said cradle for elastically constraining the walls of said pan inward and angularly from the base portion of said pan, each wall of said pan and said base portion defining in the constrained position of said pan in said cradle an included angle less than 90°, the section cast in said pan being subsequently removable with said pan from said cradle by upward movement of said pan and casting, the removal of the constraint upon the side walls of said pan causing said side walls to move elastically away from the finished cast section to a position affording clearance between the side walls of said pan and said cast section for the removal of the pan from the so cast section, said finished cast section being characterized by battered side walls.

4. Apparatus of the class described for casting a concrete beam or the like wherein all of the operations of casting and stripping the finished casting are characterized by the elimination of any operation requiring turning over of the apparatus and the finished casting, said apparatus comprising a fixed longitudinally extending cradle including a base and laterally spaced rigid side walls secured to said base, a pan movable with respect to said cradle and adapted to be inserted between the walls of said cradle for the casting therein of a concrete shape, said pan being formed from resilient material and comprising a base portion with laterally spaced walls extending upward therefrom, the width of said base portion corresponding substantially to the interior spacing of the walls of said cradle, each wall of said pan and said base portion defining in the unconstrained position of said pan outside of said cradle an included angle greater than 90°, and means supported by the walls of said pan for constraining the walls thereof inward and angularly from the base portion of said pan, each wall of said pan and said base portion defining in the constrained position of said pan in said cradle an included angle less than 90°, the section cast in said pan being subsequently removable with said pan from said cradle by upward movement of said pan and the finished casting, the removal of the constraint upon the side walls of said pan causing said side walls to move elastically away from the finished cast section to a position affording clearance between the side walls of said pan and said cast section for the removal of the pan from the so finished cast section, said finished cast section being characterized by battered side walls.

5. The invention as defined in claim 4 wherein a smooth curve is provided between each of the side walls of said pan and the base portion so that line contact is had between contiguous cast sections.

References Cited in the file of this patent

UNITED STATES PATENTS

| | | |
|---|---|---|
| 696,686 | Lyons | Apr. 1, 1902 |
| 1,562,519 | Ruppel | Nov. 24, 1925 |
| 2,299,111 | Rogers et al. | Oct. 20, 1942 |
| 2,614,309 | Price | Oct. 21, 1952 |
| 2,708,288 | Fuller et al. | May 17, 1955 |